(12) United States Patent
Han et al.

(10) Patent No.: US 12,107,230 B2
(45) Date of Patent: Oct. 1, 2024

(54) BIPOLAR LITHIUM SECONDARY BATTERY

(71) Applicant: LG ENERGY SOLUTION, LTD., Seoul (KR)

(72) Inventors: Suenghoon Han, Daejeon (KR); Jaegil Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 536 days.

(21) Appl. No.: 17/426,524

(22) PCT Filed: Jun. 12, 2020

(86) PCT No.: PCT/KR2020/007629
§ 371 (c)(1),
(2) Date: Jul. 28, 2021

(87) PCT Pub. No.: WO2020/251295
PCT Pub. Date: Dec. 17, 2020

(65) Prior Publication Data
US 2022/0102761 A1     Mar. 31, 2022

(30) Foreign Application Priority Data

Jun. 14, 2019 (KR) .................. 10-2019-0070374
Jun. 11, 2020 (KR) .................. 10-2020-0070651

(51) Int. Cl.
*H01M 10/0585* (2010.01)
*H01M 4/133* (2010.01)
(Continued)

(52) U.S. Cl.
CPC ....... *H01M 10/0585* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS

2004/0059212 A1\*   3/2004   Abreu ................ G02C 11/10
                                                   374/E13.002
2004/0067417 A1    4/2004   Oosawa et al.
(Continued)

FOREIGN PATENT DOCUMENTS

CN          1494178 A      5/2004
CN        102668225 A      9/2012
(Continued)

OTHER PUBLICATIONS

Machine translation of JP 2006-210002, published on Aug. 10, 2006 (Year: 2006).\*

(Continued)

*Primary Examiner* — Anca Eoff
(74) *Attorney, Agent, or Firm* — Birch, Stewart, Kolasch & Birch, LLP (57) ABSTRACT

A bipolar lithium secondary battery having a bipolar unit that includes a current collector with positive and negative electrodes formed on opposite sides thereof. The bipolar lithium secondary battery may prevent self-discharging and the generation of bypass currents by separating the electrolyte solutions adjacent to the electrodes having different polarities by a polymer film attached to the edge of the current collector, and by preventing the movement of the separated electrolyte solutions.

15 Claims, 6 Drawing Sheets

(51) Int. Cl.
  *H01M 4/134* (2010.01)
  *H01M 10/0525* (2010.01)
  *H01M 50/417* (2021.01)
  *H01M 50/429* (2021.01)

(52) U.S. Cl.
  CPC ..... *H01M 10/0525* (2013.01); *H01M 50/417* (2021.01); *H01M 50/4295* (2021.01)

(56) References Cited

U.S. PATENT DOCUMENTS

| | | |
|---|---|---|
| 2008/0280197 A1 | 11/2008 | Machida |
| 2011/0014520 A1 | 1/2011 | Ueda |
| 2011/0091770 A1 | 4/2011 | Han et al. |
| 2011/0189577 A1 | 8/2011 | Chung et al. |
| 2012/0315545 A1 | 12/2012 | Son et al. |
| 2014/0079992 A1 | 3/2014 | Tanaka |
| 2014/0120424 A1 | 5/2014 | Yamada et al. |
| 2017/0301962 A1 | 10/2017 | Park et al. |
| 2018/0205118 A1 | 7/2018 | Chu et al. |
| 2019/0044129 A1 | 2/2019 | Yadav et al. |

FOREIGN PATENT DOCUMENTS

| | | |
|---|---|---|
| CN | 103219521 A | 7/2013 |
| CN | 106033823 A | 10/2016 |
| CN | 106716702 A | 5/2017 |
| JP | 2004-134116 A | 4/2004 |
| JP | 2005-190713 A | 7/2005 |
| JP | 2006-508518 A | 3/2006 |
| JP | 2006-164782 A | 6/2006 |
| JP | 2006-210002 A | 8/2006 |
| JP | 2013-110081 A | 6/2013 |
| KR | 10-2002-0018393 * | 3/2002 |
| KR | 10-2008-0099163 A | 11/2008 |
| KR | 10-2011-0041870 A | 4/2011 |
| KR | 10-2012-0135808 A | 12/2012 |
| KR | 10-2013-0105362 A | 9/2013 |
| KR | 10-2014-0009497 A | 1/2014 |
| KR | 10-2014-0051240 A | 4/2014 |
| KR | 10-2014-0070199 A | 6/2014 |
| KR | 10-1501337 B1 | 3/2015 |
| KR | 10-2016-0037079 A | 4/2016 |
| KR | 10-2017-0106125 A | 9/2017 |
| KR | 10-2017-0135180 A | 12/2017 |
| KR | 10-2018-0014819 A | 2/2018 |
| WO | WO 2004/051767 A1 | 6/2004 |
| WO | WO 2010/010717 A1 | 1/2010 |

OTHER PUBLICATIONS

Machine translation of KR 10-2002-0018393, published on Mar. 8, 2002 (Year: 2002).*

Extended European Search Report for European Application No. 20822422.0, dated Feb. 2, 2022.

Gambe et al., "Development of Bipolar All-solid-state Lithium Battery Based on Quasi-solid-state Electrolyte Containing Tetraglyme-LiTFSA Equimolar Complex," Scientific Reports, vol. 5, No. 8869, 2015, pp. 1-4.

International Search Report (PCT/ISA/210) issued in PCT/KR2020/007629, dated Sep. 24, 2020.

* cited by examiner

BIPOLAR LITHIUM SECONDARY BATTERY

CROSS REFERENCE TO RELATED APPLICATIONS

This application is the National Phase of PCT International Application No. PCT/KR2020/007629, filed on Jun. 12, 2020, which claims priority under 35 U.S.C. 119 (a) to Patent Application Nos. 10-2019-0070374 and 10-2020-0070651, filed in the Republic of Korea on Jun. 14, 2019, and Jun. 11, 2020 respectively, all of which are hereby expressly incorporated by reference into the present application.

TECHNICAL FIELD

One aspect of the present disclosure relates to a bipolar lithium secondary battery comprising a bipolar unit in which electrode layers having different polarities are formed on both sides of a current collector.

BACKGROUND ART

A secondary battery is a battery capable of charging and discharging, unlike a primary battery that cannot be charged. Low-capacity secondary batteries are used in portable electronic devices such as cell phones, notebooks, or camcorders, and high-capacity secondary batteries are widely used as power sources for driving motors in hybrid vehicles and the like.

Recently, a high-capacity secondary battery having a high energy density and a high power using a non-aqueous electrolyte solution has been developed. The high-capacity secondary battery having high energy density and high power is configured by connecting a plurality of secondary batteries in series so that they can be used to drive instruments that require electric power, such as motors in electric vehicles and the like.

The secondary battery may comprise a general monopolar electrode coated with active materials having the same polarity on both sides of the current collector or a bipolar electrode coated with active materials having different polarities on both sides of the current collector.

A secondary battery to which a general monopolar electrode is applied comprises a structure in which a connection portion for connecting electrodes is formed, but this structure causes a problem that the output is lowered by the electrical resistance of the connection. The bipolar electrode is an electrode that can be used by stacking electrodes without such a connection portion, thereby minimizing the connection resistance.

Meanwhile, in the case of a bipolar secondary battery comprising bipolar electrodes, it is very important to seal the electrolyte solutions to prevent leakage between the stacked bipolar electrodes, and at the same time, it is also necessary to reduce the thickness of the bipolar secondary battery.

In general, a gasket is used for sealing to prevent leakage of electrolyte solution, but there is a problem that it is difficult to manufacture a gasket having a thickness of 1 mm or less, and if the thickness of the gasket is too large, there are problems that the empty space between the bipolar electrodes becomes large, and thus the output compared to the volume is lowered.

In addition, in the bipolar electrode, when electrolyte solutions adjacent to electrodes having different polarities are moved and mixed, self-discharging and bypass current may occur, and thus there is a need to develop a technology capable of preventing such problems.

PRIOR ART DOCUMENT (Patent Document 1)
Japanese Laid-open Patent Publication No. 2005-190713

DISCLOSURE

Technical Solution

In order to achieve the above object, one aspect of the present disclosure provides a bipolar lithium secondary battery comprising:
a current collector having a first surface, a second surface opposite the first surface, and an edge defining a perimeter of the current collector;
a polymer film extending outward from the edge of the current collector;
a first positive electrode on the first surface of the current collector;
a first negative electrode on the second surface of the current collector;
first and second separators respectively formed on the positive electrode and the negative electrode; and
a first electrolyte solution contained between the first separator and the polymer film and the first surface of the current collector;
a second electrolyte solution contained between the second separator and the polymer film and the second surface of the current collector such that the second electrolyte solution is separated from the first electrolyte solution.

Technical Solution

In order to achieve the above object, one aspect of the present disclosure provides a bipolar lithium secondary battery comprising,
a current collector;
a polymer film attached in the form surrounding the edge of the current collector;
an electrode layer comprising positive and negative electrodes formed on both sides of the current collector;
first and second separators respectively formed on the positive electrode and the negative electrode; and
electrolyte solutions contained between the first and second separators,
wherein the electrolyte solutions contained between the first and second separators are separated by the polymer film.

Advantageous Effects

According to one aspect of the present disclosure, in a lithium secondary battery comprising a bipolar unit in which positive and negative electrodes are formed respectively on both sides of one current collector, since electrolyte solutions adjacent to the positive electrode and the negative electrode respectively are separated by a polymer film attached to the edge of the current collector, it is possible to prevent movement and mixing between the separated electrolyte solutions, thereby preventing the self-discharging and bypass current generation.

In addition, in the case of the lithium secondary battery according to the present invention, the unit cells comprising the positive electrode and the negative electrode may be connected in series in the battery through the current collector comprised in the bipolar unit, thereby reducing the weight and volume of the auxiliary material, thereby securing a higher energy density.

BEST MODE

Hereinafter, the present invention will be described in more detail to help understanding of the present invention.

As used herein, the term "bipolar unit" may be a unit comprising an electrode layer containing active materials having different polarities on both sides of one current collector, and for example, the bipolar unit may be a unit comprising a positive electrode and a negative electrode formed on both sides of the current collector and the current collector.

The terms "positive electrode" and "negative electrode" used in this specification may mean a positive electrode active material layer and a negative electrode active material layer, respectively. Generally, the positive electrode comprises a positive electrode current collector and a positive electrode active material layer, and the negative electrode comprises a negative electrode current collector and a negative electrode active material layer, but the "positive electrode" and "negative electrode" comprised in the bipolar unit according to the present invention may mean a positive electrode active material layer and a negative electrode active material layer formed separately from the current collector.

As used herein, the term "unit cell" means a structure comprising a positive electrode, a negative electrode, and a separator interposed therebetween.

As used herein, the term "bipolar lithium secondary battery" means a lithium secondary battery comprising at least one "bipolar unit" defined as above.

Bipolar Lithium Secondary Battery

One aspect of the present disclosure relates to a bipolar lithium secondary battery comprising a bipolar unit in which electrode layers comprising active materials having different polarities are formed on both sides of one current collector.

Hereinafter, one aspect of the present disclosure will be described in more detail with reference to the drawings.

Figure 1:
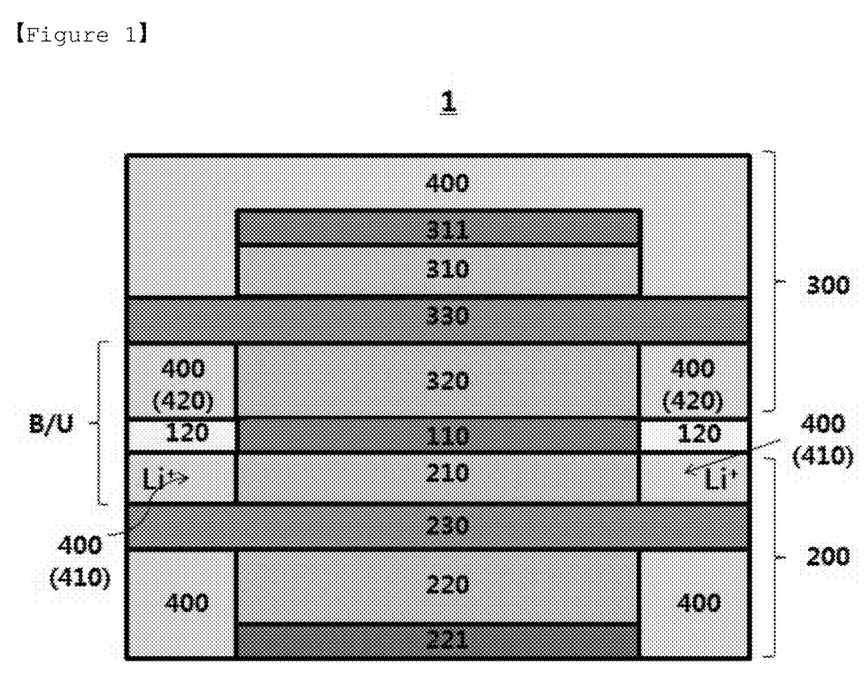
FIG. 1 is a schematic view showing a cross-section of a bipolar lithium secondary battery according to an embodiment of the present invention.

FIG. 1 is a schematic diagram showing a cross-section of a bipolar lithium secondary battery according to an embodiment of the present invention. The cross-section may be a longitudinal section.

Referring to FIG. 1, the bipolar lithium secondary battery 1 comprises a current collector 110 and a polymer film 120 formed on the edges of the current collector 110, and electrode layers of different polarities, that is, a positive electrode 320 and a negative electrode 210 may be stacked on both sides of the current collector 110, respectively. As described above, a structure configured by forming the positive electrode 320 and the negative electrode 210, which are electrode layers of different polarities, on both sides of one current collector 110 may be referred to as a bipolar unit (B/U). At this time, the current collector 110 may also be referred to as a current pathway.

In addition, the second separator 230, the positive electrode 220, and the positive electrode current collector 221 may be sequentially stacked on the negative electrode 210 formed on one surface of the current collector 110, and this is called the second unit cell 200.

In addition, the first separator 330, the negative electrode 310, and the negative electrode current collector 311 may be sequentially stacked on the positive electrode 320 formed on the other surface of the current collector 110, and this is called the first unit cell 300.

The bipolar lithium secondary battery 1 may have a form in which the second unit cell 200 and the first unit cell 300 are connected in series inside the battery, and specifically are connected in series through the current collector 110.

Also, the bipolar lithium secondary battery 1 may comprise an electrolyte solution 400 injected therein.

Further, the separators 330 and 230 may have a size (area) of the transverse section that is equal to the sum of the sizes of the transverse sections of the current collector 110 and the polymer film 120. In addition, the size (area) of the transverse sections of the separators 330 and 230 may be larger than the size of the transverse sections of the positive electrodes 220 and 320 and the negative electrodes 210 and 310. When the size of the transverse sections of each component comprised in the bipolar lithium secondary battery 1 is defined as described above, the electrolyte solution 400 comprised between the separators 330 and 230 may be separated by the polymer film 120.

Accordingly, the polymer film 120 attached in the form surrounding the edges of the current collector 110 may separate the electrolyte solution contained between the separators 230 and 330, thereby dividing into the first electrolyte solution 420 and the second electrolyte solution 410. Specifically, the first electrolyte solution 420 may be comprised in a form surrounded by the polymer film 120, the positive electrode 320, and the first separator 330, and the second electrolyte solution 410 may be comprised in a form surrounded by the polymer film 120, the negative electrode 210, and the second separator 230. At this time, the first electrolyte solution 420 means an electrolyte solution in contact with the positive electrode 320 and may also be referred to as an electrolyte solution on the positive electrode side, and the second electrolyte solution 410 means an electrolyte solution in contact with the negative electrode 210 and may also be referred to as an electrolyte solution on the negative electrode side.

The first electrolyte solution 420 and the second electrolyte solution 410 are separated by the polymer film 120 to prevent their mutual movement, thereby preventing self-discharging and bypass current that may occur when these electrolyte solutions are mixed.

In one aspect of the present disclosure, the polymer film may serve to prevent movement and mixing of the electrolyte solution adjacent to the positive electrode and the negative electrode formed on both sides of the current collector in the bipolar lithium secondary battery. Specifically, when the negative electrode is a lithium negative electrode containing lithium metal, lithium ions ($Li^+$) dissolved in the electrolyte solution from the negative electrode may be prevented from moving from the negative electrode to the positive electrode through the electrolyte solution. In addition, when the positive electrode is a positive electrode containing sulfur, polysulfide dissolved from the positive electrode into the electrolyte solution may be prevented from moving from the positive electrode to the negative electrode through the electrolyte solution.

As described above, the polymer film physically separates the electrolyte solution on the positive electrode side and the electrolyte solution on the negative electrode side to prevent the movement of lithium ions through the electrolyte solution. Therefore, the polymer film is not particularly limited as long as it may not be permeated by the electrolyte solution while not dissolving in the electrolyte solution.

For example, the polymer film may be a single-layer film comprising a non-porous membrane, or a laminated film formed by laminating a non-porous membrane and a porous membrane.

The non-porous membrane may have a porosity of 30% or less, 20% or less, or 10% or less. If the porosity of the non-porous membrane is more than 30%, lithium ions move smoothly, thereby generating bypass current. In addition, in the case of a lithium-sulfur secondary battery containing sulfur in the positive electrode, lithium polysulfide (LiPS) is leached from the positive electrode and then flows into the negative electrode, causing a direct reaction between the positive electrode and the negative electrode comprised in the bipolar unit. In addition, the porosity of the non-porous membrane may be preferably greater than 0%.

In the case where the porosity of the non-porous membrane is expressed in a different way, it may be defined as a Gurley number that is a measure of air permeability. For example, the Gurley Number of the non-porous membrane may be 1,000 [s/100 cc] or more, 2,000 [s/100 cc] or more, 3,000 [s/100 cc] or more, 4,000 [s/100 cc] or more, 5,000 [s/100 cc] or more, 6,000 [s/100 cc] or more, 7,000 [s/100 cc] or more, 8,000 [s/100 cc] or more, 9,000 [s/100 cc] or more, or 10,000 [s/100 cc] or more. The upper limit of the Gurley number may be 15,000 [s/100 cc] or less, but is not limited thereto. The Gurley number means that the larger the number, the more difficult the material is to permeate. If the Gurley number is less than 1,000 [s/100 cc], it is possible to mutually move between electrolyte solutions separated by the non-porous membrane, thereby generating bypass current and self-discharging.

In addition, the porous membrane is not particularly limited as long as it is a porous membrane commonly used as a separator for lithium secondary batteries.

For example, the porous membrane may have a porosity of more than 30%, 70% or less, specifically more than 30%, 35% or more, 40% or more, or 45% or more, and 55% or less, 60% or less, 65% or less, or 70% or less.

In addition, the non-porous membrane and porous membrane may be classified by the prescribed porosity and/or Gurley number. Materials for the non-porous membrane and porous membrane may be the same or different, and may comprise one or more selected from the group consisting of polyolefin, cellulose, and fluorine resin. The polyolefin may comprise one or more selected from the group consisting of polyethylene, polypropylene, polybutylene, polypentene, polyhexene, and polyoctene.

In addition, the polymer film may be applied to all types of bipolar lithium secondary batteries. Specifically, since the polymer film serves to physically prevent the movement of lithium ions dissolved into the electrolyte solution, the polymer film may also more effectively prevent the occurrence of self-discharging and bypass current, in the secondary battery of the conversion type in which the reaction proceeds when lithium ions are dissolved into the electrolyte solution, as compared to a battery in which lithium ions are inserted into a positive electrode active material (lithiation or delithiation, Li+ insertion or intercalation). A lithium-sulfur secondary battery is exemplified as the conversion type secondary battery.

In one aspect of the present disclosure, the positive electrode may comprise a positive electrode active material layer comprising a positive electrode active material, a binder, and an electrically conductive material.

The positive electrode active material may comprise sulfur, and specifically, the sulfur may be selected from the group consisting of elemental sulfur (S8), sulfur-based compounds, and sulfur-carbon composites. The sulfur-based compound may specifically be $Li_2S_n(n≥1)$, an organic sulfur compound, or a carbon-sulfur polymer $((C_2S_x)_n$: x=2.5 to 50, n≥2).

In general, a battery containing sulfur in the positive electrode may be a lithium-sulfur secondary battery, and thus, the bipolar lithium secondary battery according to one aspect of the present disclosure may be a bipolar lithium-sulfur secondary battery.

The positive electrode active material may be comprised in an amount of 60 to 95% by weight based on the total weight of the positive electrode active material layer, and specifically, the content of the positive electrode active material is 60% by weight or more, 65% by weight or more, or 70% by weight or more, and 85% by weight or less, 90% by weight or less, or 95% by weight or less. If the content of the positive electrode active material is less than the above range, the performance of the battery may be deteriorated. If the content of the positive electrode active material exceeds the above range, the content of an electrically conductive material or binder other than the positive electrode active material may be relatively reduced, thereby deteriorating characteristics such as an electrically conductive property or durability.

In addition, the binder may be styrene-butadiene rubber (SBR)/carboxymethyl cellulose (CMC), poly(vinyl acetate), polyvinyl alcohol, polyethylene oxide, polyvinylpyrrolidone, alkylated polyethylene oxide, crosslinked polyethylene oxide, polyvinyl ether, poly (methyl methacrylate), polyvinylidene fluoride, copolymer of polyhexafluoropropylene and polyvinylidene fluoride, poly(ethyl acrylate), polytetrafluoroethylene, polyvinyl chloride, polyacrylonitrile, polyvinylpyridine, polystyrene, polyacrylic acid, or derivatives, blends, or copolymers thereof or the like.

In addition, the content of the binder may be 1% by weight to 20% by weight, specifically 1% by weight or more, 3% by weight or more, or 5% by weight or more, and 15% by weight or less, 18% by weight or less, or 20% by weight or less, based on the total weight of the positive electrode active material layer. If the content of the binder is less than the above range, the binding force between positive electrode active materials or between positive electrode active materials and current collector may be greatly declined, and there may occur a problem that capacity characteristics may be deteriorated, and the interaction between the poly sulfide and a specific functional group of a polymer chain used as a binder is weakened, and thus poly sulfide may be leached. If the content of the binder exceeds the above range, the capacity of the battery may be decreased.

The electrically conductive material is not particularly limited, but may be, for example, graphite such as natural graphite or artificial graphite; carbon blacks such as carbon black (Super-p), acetylene black, Ketjen black, channel black, furnace black, lamp black, thermal black, and Denka black; electrically conductive fibers such as carbon fiber or metal fiber; carbon fluoride; metal powders such as aluminum powder and nickel powder; electrically conductive whiskers such as zinc oxide and potassium titanate; electrically conductive metal oxides such as titanium oxide; or electrically conductive materials such as polyphenylene derivatives. The electrically conductive material may typically be present in an amount of 0.05 wt. % to 10 wt. % based on the total weight of the positive electrode active material layer. Specifically, the content of the electrically conductive material may be 0.05 wt. % or more, 1 wt. % or more, 3 wt. % or more, or 5 wt. % or more, and 8 wt. % or less, 9 wt. % or less, or 10 wt. % or less.

In addition, the positive electrode current collector is not particularly limited as long as it has a high electrical conductivity without causing chemical changes in the relevant battery, and for example, stainless steel, aluminum, nickel, titanium, sintered carbon, or aluminum or stainless steel surface-treated with carbon, nickel, titanium, silver or the like may be used. In this case, the positive electrode current collector may be formed in various forms such as film, sheet, foil, net, porous body, foam, or nonwoven fabric having fine irregularities formed on its surface in order to enhance the bonding force with the positive electrode active material.

In one aspect of the present disclosure, the negative electrode may comprise lithium metal or lithium alloy.

Alternatively, the negative electrode may comprise a negative electrode active material, a binder, and an electrically conductive material. The negative electrode active material may comprise a material capable of reversibly intercalating or de-intercalating lithium ion (Lit), a material capable of reacting with lithium ion to reversibly form lithium containing compounds, lithium metal, or lithium alloy. The material capable of reversibly intercalating or de-intercalating lithium ion (Lit) may be, for example, crystalline carbon, amorphous carbon, or a mixture thereof. The material capable of reacting with lithium ion (Lit) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

In addition, the binder and the electrically conductive material may be composed by the material used in the positive electrode described above.

In addition, the negative electrode current collector may be copper, stainless steel, aluminum, nickel, titanium, or sintered carbon, or aluminum or stainless steel surface-treated with carbon, nickel, titanium, silver, or the like.

In one aspect of the present disclosure, the separator is a physical separator having a function of physically separating electrodes. Any separator may be used without any particular limitations as long as it is used as a conventional separator. Particularly, a separator with excellent humidification ability for the electrolyte solution while exhibiting low resistance to ion migration of electrolyte solution is preferable.

In addition, the separator enables the lithium ion to be transported between the positive electrode and the negative electrode while separating or insulating the positive electrode and the negative electrode from each other. The separator may be made of a porous, nonconductive or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used, and a nonwoven fabric made of glass fiber having high melting point or the like may be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness may not be ensured and thus a problem of short circuit of the battery occurs. However, if a film-type separator and a polymer nonwoven fabric buffer layer are used together, the mechanical strength may also be ensured together with the improvement effect of the battery performance due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

In one aspect of the present disclosure, the electrolyte solution may be a non-aqueous electrolyte solution, and the electrolyte salt contained in the non-aqueous electrolyte solution is a lithium salt. The lithium salt may be used without limitation as long as it is commonly used in electrolyte solutions for lithium secondary batteries. For example, the lithium salt may be at least one selected from the group consisting of LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, lithium chloroborane, and lithium 4-phenyl borate.

As the organic solvent contained in the non-aqueous electrolyte solution, the organic solvents commonly used in the electrolyte solution for the lithium secondary battery may be used without limitation, and for example, ethers, esters, amides, linear carbonates, cyclic carbonates, etc. may be used alone or in combination of two or more thereof. Among them, carbonate compounds which are representatively cyclic carbonates, linear carbonates, or a slurry thereof may be comprised.

Specific examples of the cyclic carbonate compound may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides comprise, but are not limited to, fluoroethylene carbonate (FEC) and the like.

In addition, specific examples of the linear carbonate compound may be, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a slurry of two or more thereof. In particular, ethylene carbonate and propylene carbonate, which are cyclic carbonates in the carbonate-based organic solvent, are highly viscous organic solvents having a high dielectric constant, so that the lithium salt in the electrolyte may be more easily dissociated. If such cyclic carbonates are mixed with linear carbonates having a low viscosity and a low dielectric constant, such as dimethyl carbonate and diethyl carbonate, in an appropriate ratio, an electrolyte solution having a higher electrical conductivity may be produced.

In addition, the ether among the organic solvents may be, but is not limited to, at least one selected from the group consisting of dimethyl ether, diethyl ether, dipropyl ether, methylethyl ether, methylpropyl ether, and ethylpropyl ether, or a slurry of two or more thereof.

In addition, the ester among the organic solvents may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a slurry of two or more thereof.

The injection of the non-aqueous electrolyte solution may be performed at an appropriate stage of the manufacturing process of the electrochemical device depending on the manufacturing process and required properties of the final product. That is, it may be applied before assembling the electrochemical device or in the final stage of assembling the electrochemical device.

In the case of the lithium secondary battery according to one aspect of the present disclosure, it is possible to perform laminating or stacking and folding processes of the separator and the electrode, in addition to the winding process which is a general process.

In addition, the shape of the battery case is not particularly limited, and may be of various shapes such as a cylindrical shape, a laminate shape, a square shape, a pouch shape, or a coin shape. The structure and manufacturing method of these batteries are widely known in the art, and thus detailed description thereof will be omitted.

In addition, the lithium secondary battery may be classified into various batteries, such as a lithium-sulfur battery, a lithium-air battery, a lithium-oxide battery, and a lithium all-solid battery, depending on the positive electrode/negative electrode material used.

In addition, one aspect of the present disclosure provides a battery module comprising the lithium secondary battery as a unit cell.

The battery module may be used as a power source of medium or large-sized devices requiring high temperature stability, long cycle characteristics, and high capacity characteristics.

Examples of the medium or large-sized devices may comprise, but are not limited to, a power tool that is powered and moved by an electric motor; electric cars comprising an electric vehicle (EV), a hybrid electric vehicle (HEV), a plug-in hybrid electric vehicle (PHEV), and the like; an electric motorcycle comprising an electric bike (E-bike) and an electric scooter (E-scooter); an electric golf cart; and a power storage system.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention, and also it is natural that such variations and modifications are within the scope of the appended claims.

Example 1

A PE film (polyethylene, 20 μm thick) having a porosity of 20%, which is a non-porous membrane as a polymer film, was attached to the edge of a Cu foil (LS Cable & System, 20 μm thick) as a current collector.

Thereafter, positive and negative electrodes were formed on the upper and lower surfaces of the current collector in the following manner.

In order to form the positive electrode, a positive electrode slurry having a concentration of 20% (concentration based on solid content) was prepared by mixing the sulfur-carbon composite, the electrically conductive material, and the binder in a weight ratio of 90:5:5 and dissolving them in water. The positive electrode slurry was coated on the top surface of the current collector using a bar coating method, and then dried at 50° C. for 2 hours to form a positive electrode. The dried positive electrode was rolled using a roll press so that porosity was 65%. At this time, the sulfur-carbon composite was prepared by mixing sulfur and carbon at a weight ratio of 70:30 and heat-treating at 155° C., wherein CNTs having a specific surface area of 300 m²/g and a particle diameter of 30 μm were used as the carbon. In addition, a vapor grown carbon fiber (VGCF) was used as the conductive material, and polyvinylidene fluoride (PVDF) was used as the binder.

As the negative electrode, lithium foil was attached to the lower surface of the current collector. At this time, the lithium foil was pressed and attached with a roll press.

In addition, first and second separators were stacked on the positive electrode and the negative electrode. As both of the first and second separators, polyethylene separators having a thickness of 20 μm and a porosity of 45% were used.

Thereafter, the lithium negative electrode and the Cu foil, which is a negative electrode current collector, are sequentially stacked on the first separator formed on the positive electrode, and the positive electrode and the aluminum foil, which is a positive electrode current collector, were sequentially stacked on the second separator formed on the negative electrode. At this time, as the positive and negative electrodes, positive and negative electrodes of the same type as described above were formed in the same manner.

Thereafter, an electrolyte solution was injected into the case to manufacture a lithium-sulfur secondary battery. At this time, the electrolyte solution was prepared by dissolving lithium bis(trifluoromethyl sulfonyl)imide (LiTFSI) at a concentration of 3.0M in an organic solvent, and the organic solvent is a solvent obtained by mixing propionitrile (first solvent) and 1H,1H,2'H,3H-decafluorodipropyl ether (second solvent) in a 3:7 weight ratio (w/w).

In Example 1, two unit cells comprising the positive electrode, the negative electrode, and the separator are serially connected internally through a current collector to which the polymer film is attached.

Comparative Example 1

Figure 2:
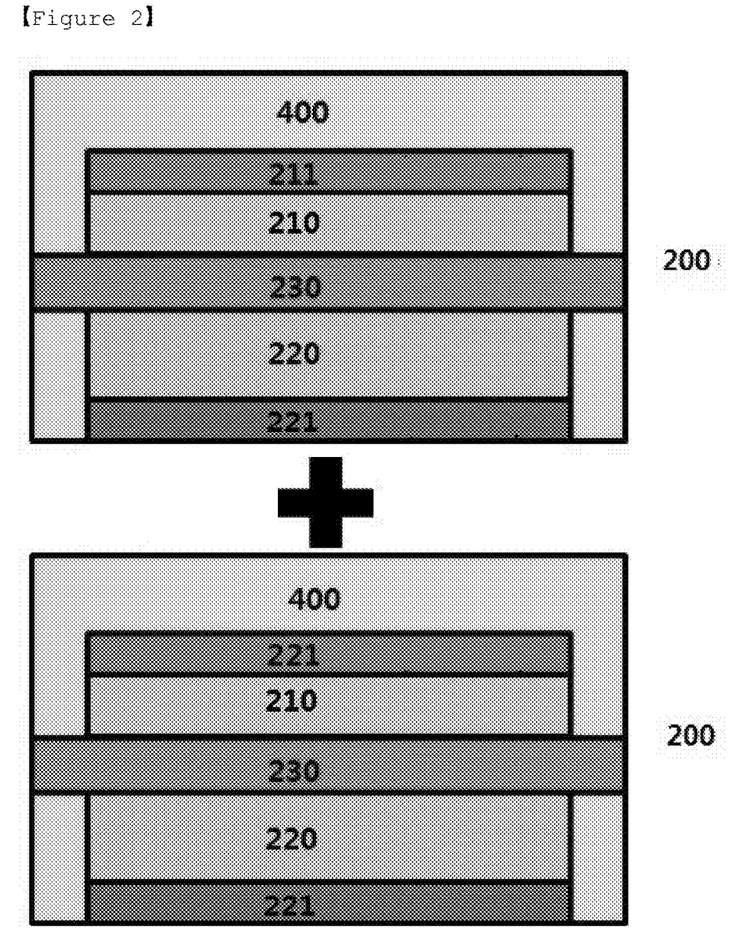
FIG. 2 is a schematic view showing a cross-section of a lithium-sulfur secondary battery according to Comparative Example 1.

As shown in FIG. 2, after sequentially stacking the positive electrode 220, the separator 230, the negative electrode 210, and the copper foil as the negative electrode current collector 211 on the aluminum foil as the positive electrode current collector 221, the electrolyte solution 400 was injected into the case to manufacture a unit cell 200. At this time, the configuration and formation of the positive electrode current collector, positive electrode, separator, negative electrode, and negative electrode current collector are the same as in Example 1. At this time, a polymer film was not attached to the positive electrode current collector 221 and the negative electrode current collector 211.

A lithium-sulfur secondary battery was manufactured by connecting two unit cells in series to the outside (FIG. 2).

Comparative Example 2

Figure 3:
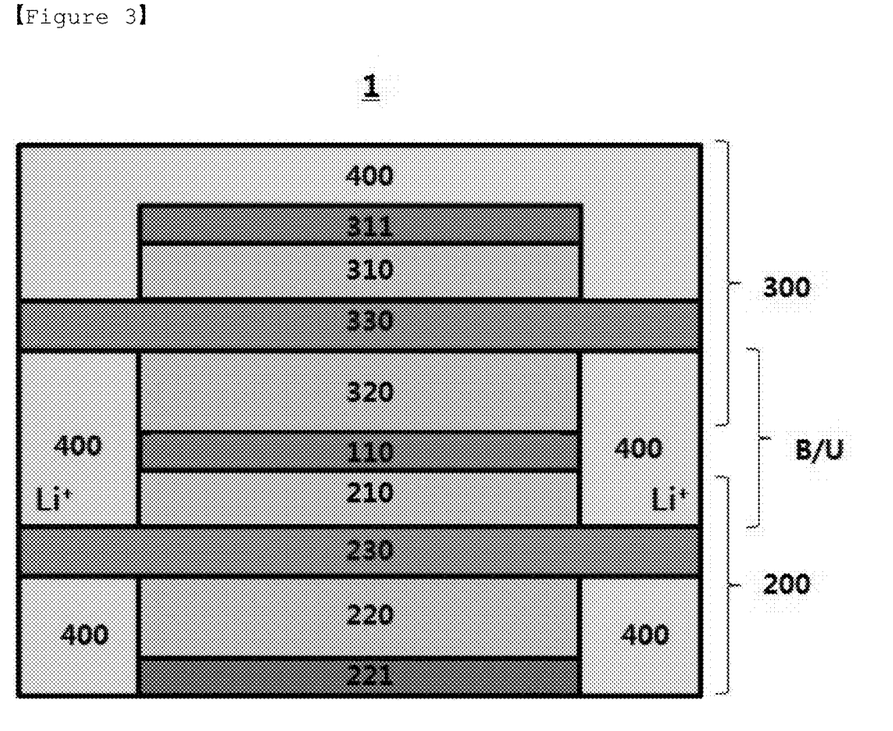
FIG. 3 is a schematic view showing a cross-section of a bipolar lithium-sulfur secondary battery according to Comparative Example 2.

A bipolar lithium-sulfur secondary battery was prepared in the same manner as in Example 1, except that a polymer film is not attached to the edge of the current collector. In Comparative Example 2, two unit cells comprising the positive electrode, the negative electrode, and the separator are connected in series through the current collector (FIG. 3).

Experimental Example 1: Analysis of the Improvement Effect on the Performance of Lithium-Sulfur Secondary Battery Experiments were performed on the performance of lithium-sulfur secondary batteries prepared in Example 1 and Comparative Examples 1 and 2, respectively. Example 1 is a bipolar lithium-sulfur secondary battery that comprises a current collector with a polymer film attached to its edge (a form formed by connecting two unit cells in series inside the battery by a current collector with a polymer film attached to the edge), Comparative Example 1 is a lithium-sulfur secondary battery in which two unit cells are connected in series from the outside of the battery, and Comparative Example 2 is a bipolar lithium-sulfur secondary battery that comprises a current collector without the polymer film attached as in Example 1.

The lithium-sulfur secondary batteries prepared in Example 1 and Comparative Examples 1 and 2, respectively were discharged at 0.1 C to measure discharging capacity.

Figure 4:
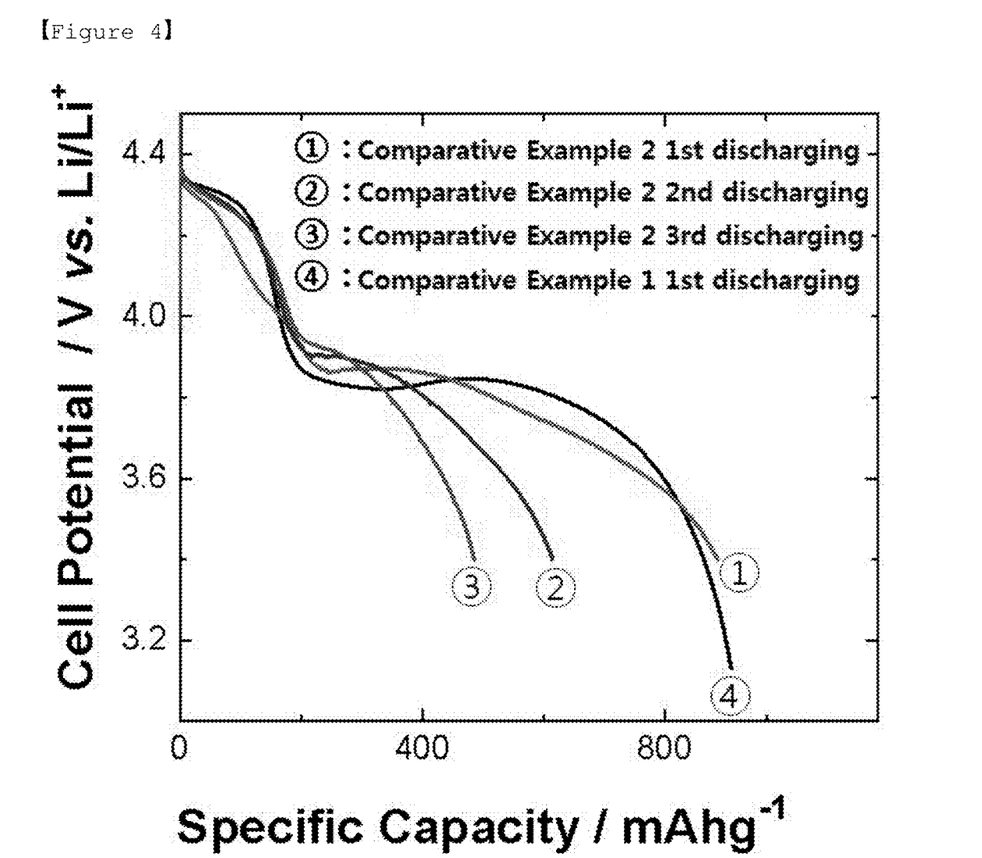
FIG. 4 is a graph of the measurement results of the discharging capacity for the lithium-sulfur secondary batteries prepared in Comparative Example 1 and Comparative Example 2, respectively.
Figure 5:
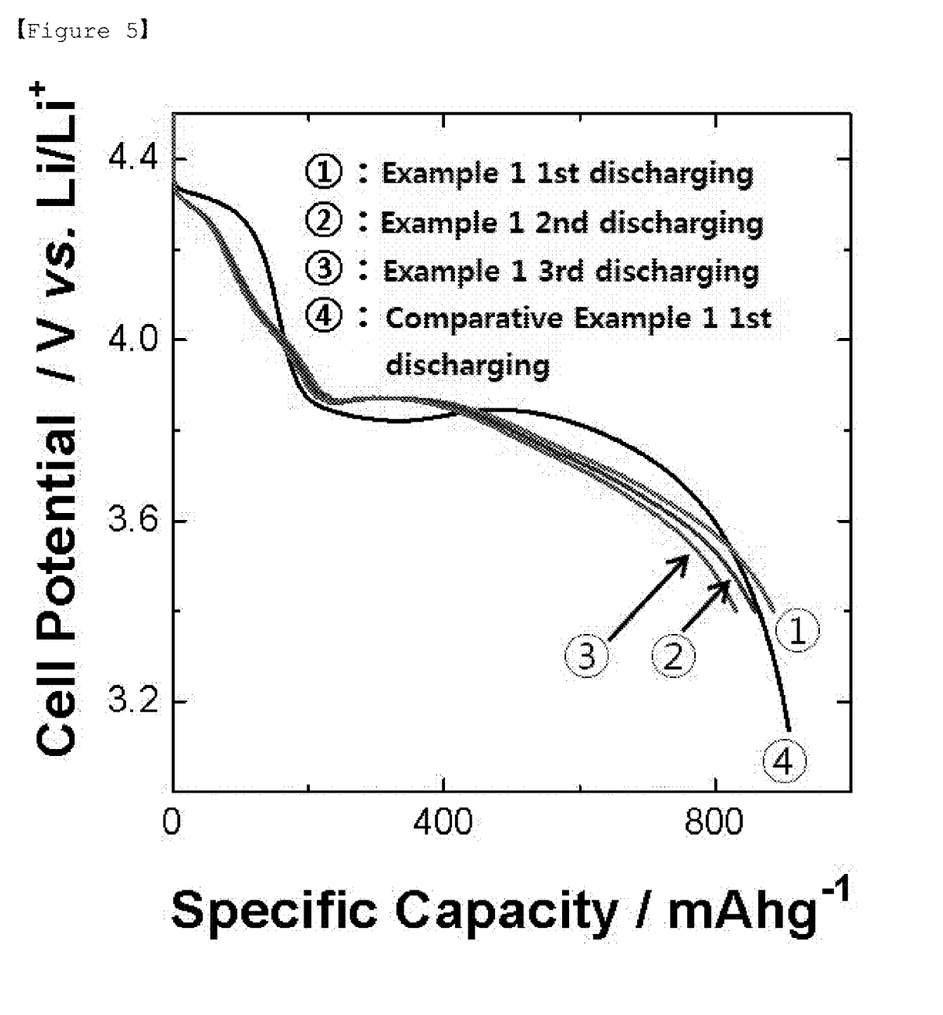
FIG. 5 is a graph of the measurement results of the discharging capacity for the lithium-sulfur secondary batteries prepared in Comparative Example 1 and Example 1, respectively.

FIG. 4 is a graph of the measurement results of the discharging capacity for the lithium-sulfur secondary batteries prepared in Comparative Example 1 and Comparative Example 2, respectively, and FIG. 5 is a graph of the measurement results of the discharging capacity for the lithium-sulfur secondary batteries prepared in Comparative Example 1 and Example 1, respectively.

Referring to FIG. 4, it was confirmed that in the case where a bipolar lithium-sulfur secondary battery is configured without attaching a polymer film to the edge of the current collector as in Comparative Example 2, as charging/discharging is repeated, self-discharging occurs due to the generation of bypass current, thereby reducing discharging capacity, as compared to Comparative Example 1 in which two unit cells are connected in series from the outside.

Referring to FIG. 5, it can be seen that in the case of Example 1 where two unit cells are connected in series by a current collector with a polymer film attached inside the battery, the reduction in discharge capacity is small, as compared to Comparative Example 1 in which the two unit cells are connected in series from the outside of the battery.

Figure 6:
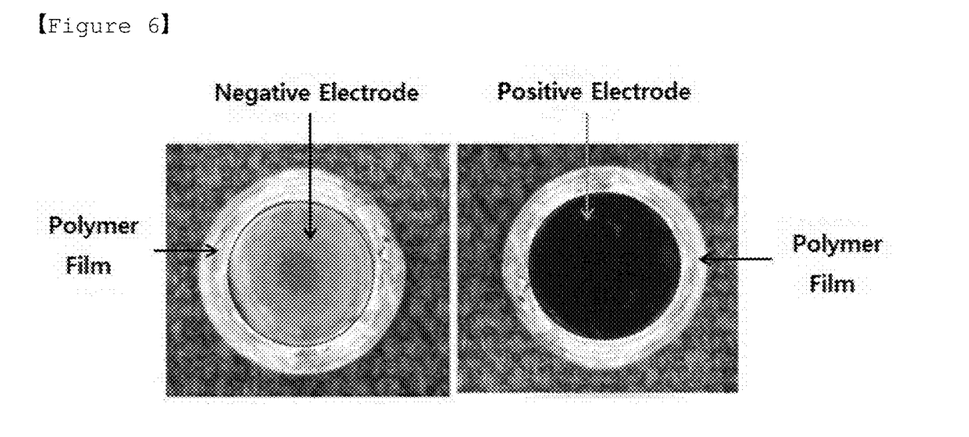
FIG. 6 is a photograph showing transverse sections of negative and positive electrodes formed on both sides of the current collector in the bipolar lithium-sulfur secondary battery of Example 1.

FIG. 6 is a photograph showing transverse sections of negative and positive electrodes formed on both sides of the current collector in the bipolar lithium-sulfur secondary battery of Example 1.

As shown in FIG. 6, upon reviewing the photograph of the transverse section of the negative electrode of the bipolar lithium-sulfur secondary battery in Example 1, the negative electrode and the polymer film attached to the edge of the current collector stacked on the negative electrode can be confirmed. Upon reviewing the photograph of the positive electrode, the positive electrode and the polymer film can be identified. From this, it can be seen that the positive electrode and the negative electrode are separated due to the polymer film attached to the edge of the current collector, and also it can be seen that due to this structure, it is possible to block the movement of $Li^+$ ions and polysulfides in the electrolyte solution during the actual operation of the battery.

In the above, although the present invention has been described by way of limited embodiments and drawings, the present invention is not limited thereto, and it is apparent to those skilled in the art that various modifications and variations can be made within the equivalent scope of the technical spirit of the present invention and the claims to be described below.

DESCRIPTION OF SYMBOLS

1: Bipolar lithium secondary battery
B/U: Bipolar unit
110: Current collector
120: Polymer film
200: Second unit cell
300: First unit cell
210, 310: Negative electrode
211, 311: Negative electrode current collector
220, 320: Positive electrode
221: Positive electrode current collector
230: Second separator, 330: First separator
400: Electrolyte solution
410: Second electrolyte solution, 420: First electrolyte solution

The invention claimed is:

1. A bipolar lithium secondary battery comprising,
a current collector having a first surface, a second surface opposite the first surface, and an edge defining a perimeter of the current collector;
a polymer film extending outward from the edge of the current collector;
a first positive electrode on the first surface of the current collector;
a first negative electrode on the second surface of the current collector;
first and second separators respectively formed on the first positive electrode and the first negative electrode;
a first electrolyte solution contained between the first separator and the polymer film and the first surface of the current collector; and
a second electrolyte solution contained between the second separator and the polymer film and the second surface of the current collector such that the second electrolyte solution is separated from the first electrolyte solution.

2. The bipolar lithium secondary battery according to claim 1, wherein the polymer film comprises a non-porous membrane.

3. The bipolar lithium secondary battery according to claim 2, wherein the non-porous membrane comprises at least one selected from the group consisting of polyolefin, cellulose and fluorine resin.

4. The bipolar lithium secondary battery according to claim 2, wherein the non-porous membrane has a porosity of 30% or less.

5. The bipolar lithium secondary battery according to claim 1, wherein the polymer film is a laminated polymer film comprising a non-porous membrane and a porous membrane.

6. The bipolar lithium secondary battery according to claim 5, wherein the non-porous membrane comprises at least one selected from the group consisting of polyolefin, cellulose and fluorine resin.

7. The bipolar lithium secondary battery according to claim 5, wherein the non-porous membrane has a porosity of 30% or less.

8. The bipolar lithium secondary battery according to claim 1, wherein the positive electrode comprises at least one selected from the group consisting of elemental sulfur (S8), a sulfur-based compound, and a sulfur-carbon composite.

9. The bipolar lithium secondary battery according to claim 1, wherein the negative electrode comprises lithium metal or lithium alloy.

10. The bipolar lithium secondary battery according to claim 1, wherein the first and second electrolyte solutions are separated by the polymer film to prevent their mutual movement around the edge of the current collector.

11. The bipolar lithium secondary battery according to claim 1, wherein mutual movement of polysulfide contained in the first electrolyte solution adjacent to the first positive electrode and lithium ions contained in the second electrolyte solution adjacent to the first negative electrode is prevented by the polymer film.

12. The bipolar lithium secondary battery according to claim 1, further comprising:
a second positive electrode located on the second separator; and
a positive electrode current collector located on the second positive electrode.

13. The bipolar lithium secondary battery according to claim 12, further comprising:
a second negative electrode located on the first separator; and
a negative electrode current collector located on the second negative electrode.

14. The bipolar lithium secondary battery according to claim 1, wherein the polymer film does not contact the first separator or the second separator.

15. The bipolar lithium secondary battery according to claim 1, wherein an overall thickness of the polymer film is equal to an overall thickness of the current collector.

* * * * *